Nov. 26, 1968  A. S. VOLPIN  3,412,750
BACK SEALING ARRANGEMENT FOR GATE VALVE STEMS
Filed Oct. 25, 1966  2 Sheets-Sheet 2
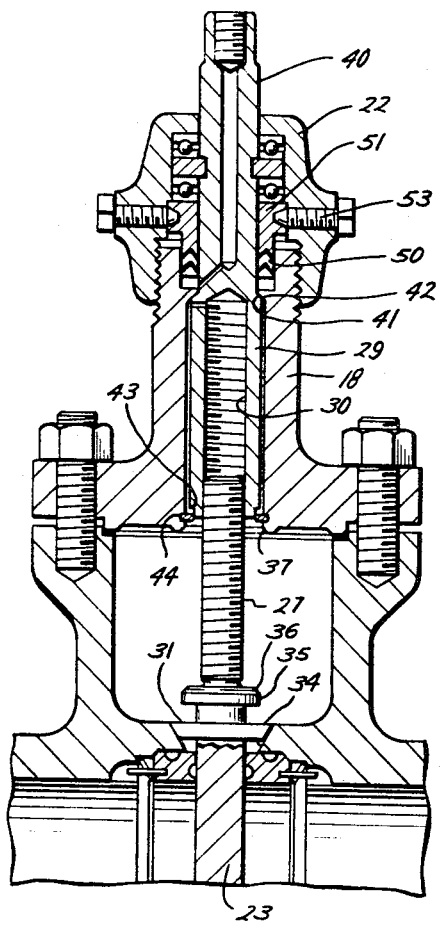
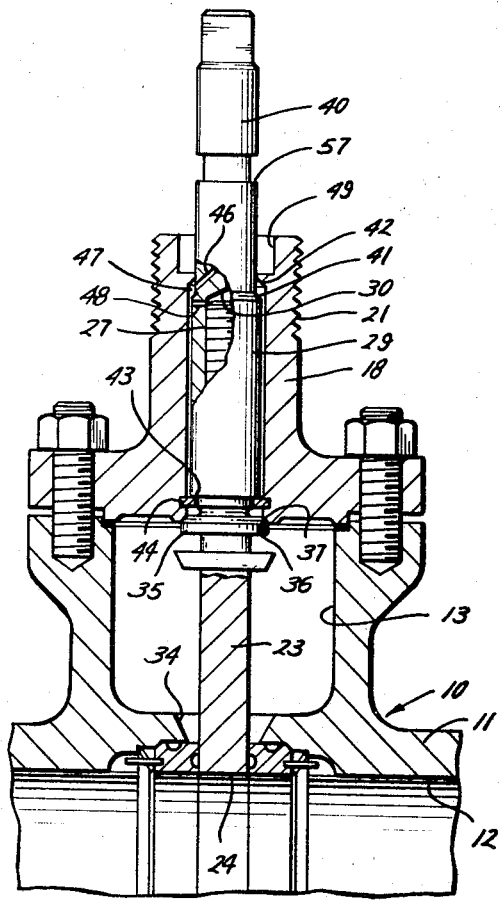
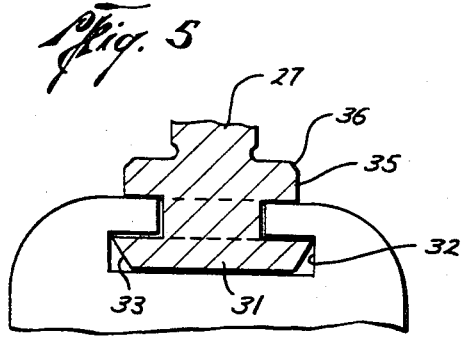
Alexander S. Volpin
INVENTOR
BY
ATTORNEY United States Patent Office 3,412,750
Patented Nov. 26, 1968

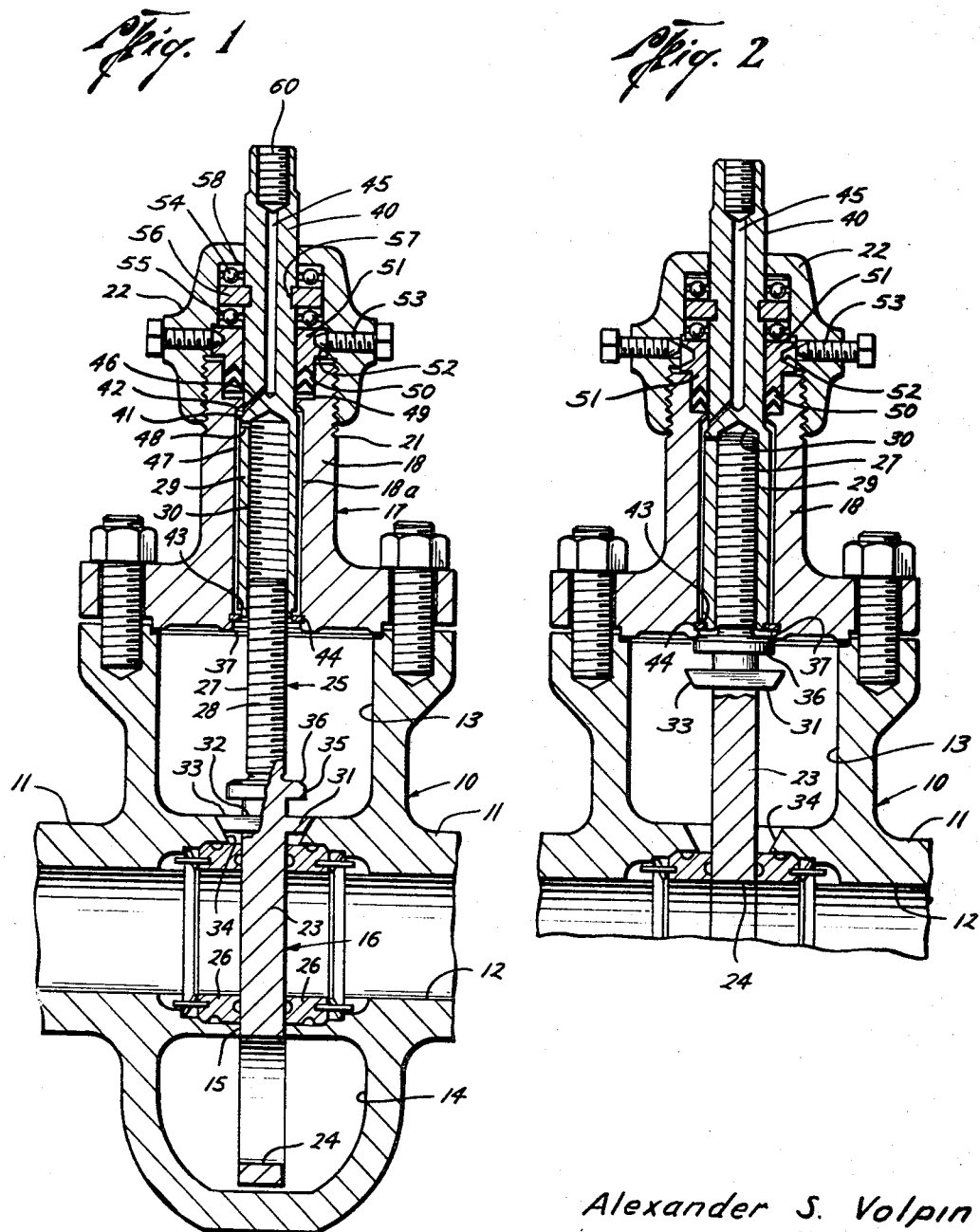

3,412,750
BACK SEALING ARRANGEMENT FOR
GATE VALVE STEMS
Alexander S. Volpin, 10200 W. Broadview Drive,
Miami Beach, Fla. 33154
Filed Oct. 25, 1966, Ser. No. 589,293
10 Claims. (Cl. 137—315)

ABSTRACT OF THE DISCLOSURE

Stem and bonnet construction for non-rising stem gate valves enabling re-packing of such valves in both the open and closed positions while under line pressure.

---

This invention relates to valves and more particularly to an improved stem and bonnet construction for gate valves of the non-rising stem type, enabling repacking of the valves while under pressure.

Non-rising stem gate valves are generally characterized by a stem construction comprising, an external operator portion which is held in the valve housing or bonnet against axial movement while being freely rotatable, and an internal stem portion connected to the gate member and having screw-threaded connection to a drive nut or sleeve carried by the operator portion whereby rotation of the latter will cause axial reciprocation of the internal stem portion and its connected gate valve member.

All such valves require sealing means between the stem and the housing or bonnet to prevent leakage of fluid from the valve housing during operation of the valve. Such sealing means ordinarily include various types of compressible packing which in course of use become worn or damaged to an extent requiring replacement to prevent leakage of fluid.

The replacement of worn packing generally requires that the valve be temporarily removed from service, as by closing it off or closing off block valves above and below the valve to be serviced, in order to permit removal of the parts necessary to provide access to the packing for its removal and replacement.

Such shut-off of fluid lines is frequently most undesirable and, when necessary, may cause a shut-down of a complete system which is dependent upon continuous fluid flow. This is particularly true with respect to oil and gas pipe lines which are frequently of very large diameter, continuously carrying large volumes of fluids for long distances under very high pressures. Such pipe lines commonly employ very large valves, usually through-conduit type gate valves, which frequently embody non-rising stem construction.

Accordingly, it is a primary object of the present invention to provide a stem construction for non-rising stem gate valves which will permit repacking of the operating stem while the valve is under fluid pressure, both in the open and closed positions of the valve closure member.

An important object is the provision of a non-rising stem construction which includes means to releasably lock and maintain a back-seat seal between the valve operating stem and the valve housing or bonnet, which will permit safe removal of the operating portion of the valve stem and the stuffing box sealing elements while the valve is under pressure and when the conduit gate opening is axially aligned with the housing flow ports.

A more specific object in accordance with this invention, is the provision of a two-part stem construction incorporating means for sealing against leakage in both the open and closed positions of the valve so as to permit repacking under pressure when the valve is in either the open or closed position.

A further object is the provision of a stem construction comprising an inner gate-reciprocating stem portion carrying shoulder means for sealingly engaging a first seat in the stem-receiving bore of the valve bonnet when the gate has attained its valve-open position, and an outer tubular stem member having a socket threadedly receiving the outer end of the inner stem member for reciprocating the gate in response to rotation of the outer stem member, and abutment means inwardly of said bore adjacent said seat disposed for axial thrusting engagement by the inner end of the outer stem member after engagement by said shoulder means with said seat whereby to lock the shoulder means tightly against said seat.

The stem-receiving bore is also provided with a second seat abutment spaced inwardly of the first-mentioned seat and disposed to be sealingly engaged by an external sealing surface on said outer stem member when the gate has attained its valve-closed position, whereby to seal-off the gate stem in the valve-closed position to permit removal of the seal housing from the bonnet for replacement of packing.

Other and more specific objects and advantages of this invention will become more readily apparent from the following description when read in conjunction with the accompanying drawing which illustrates one useful embodiment in accordance with this invention.

In the drawing:

FIG. 1 is a vertical cross-sectional view of a through-conduit type gate valve, showing the positions occupied by the gate and stem elements when the valve is in the normal closed position;

FIG. 2 is a fragmentary view of the valve of FIG. 1 with the gate and stem members in the back-sealing positions occupied at the valve-open position, preparatory to removal of the bonnet cap and seal packing elements;

FIG. 3 is a view similar to FIG. 2 showing the bonnet cap and packing elements completely removed;

FIG. 4 is a partial view similar to FIG. 1, showing the positions occupied by the stem parts when back-sealing the stem in the closed position of the gate; and FIG. 5 is a fragmentary view illustrating details of the connection between the gate and stem.

Referring to the drawing, the valve in the embodiment illustrated is of the through-conduit, non-rising stem, gate-type and comprises a housing, designated generally by the numeral 10, having coaxial opposed flow ports 11 defining the flowway 12 which is intersected interiorly of the housing by a gate chamber comprising upper and lower sections 13 and 14, respectively. The chamber sections communicate with each other and with the flowway by means of a transverse slot 15, through which a gate, designated generally by the numeral 16, may be reciprocated between positions opening and closing flowway 12. The upper end of chamber portion 13 is closed by means of a bonnet assembly, designated generally by the numeral 17, including a generally tubular bonnet member 18 having an axial bore 18a and having a flange 19 at its lower end by which it may be removably secured to the upper end of chamber portion 13 by means of studs 20. The upper end of bonnet member 18 is provided with a section of external threads 21 about which is threadably mounted a hollow bonnet cap 22 which is adapted to enclose the stuffing box and packing for the gate stem, as will be described hereinafter.

The gate or closure member 16, in the illustrative embodiment, comprises a one-piece, generally rectangular flat-sided body of the through-conduit type, comprising an upper solid closure portion 23 and a lower through-conduit opening 24. The gate is arranged for reciprocation across flowway 12 between flowway-opening and flowway-closing positions by means of a stem member, designated generally by the numeral 25.

The inner end of each of the flow ports 11 may be counterbored to receive seat rings 26 adapted to sealingly engage the opposite side faces of gate 16. The particular form of the seats for the gate may be of any conventional design, the details of which form no part of the present invention. Also, the valve construction may include automatic lubricant sealing or other generally conventional constructions, since these elements form no part of the present invention.

Stem member 25 is of a two-part construction including an inner or reciprocating portion 27, the upper section of which is externally threaded at 28, and an outer rotatable tubular portion 29 having an internally threaded socket 30 to receive the threaded section of stem portion 27 in a generally telescopic arrangement.

Inner stem portion 27 is provided at its lower end with an inverted, generally T-shaped head 31 receivable in a correspondingly shaped slot 32 in the upper end of gate 16 to form the operating connection between the stem and gate (FIG. 5). Head 31 has a polygonal peripheral configuration, such as a square or rectangular shape, having a width substantially greater than the thickness of gate 16 so as to extend outwardly from slot 32 on opposite sides of the gate. The side edges 33 of head 31 are bevelled downwardly and inwardly and are adapted to lodge in a correspondingly shaped seat 34, defined by the upper end of slot 15, when the gate is moved to its lower terminal position closing flowway 12. The non-round shape of head 31 and seat 34 functions to prevent twisting of the gate under line pressure while limiting the downward travel of the gate to a position where the gate will float out of engagement with the bottom wall of lower chamber portion 14.

Inner stem portion 27 carries an annular enlargement 35 spaced a short distance above head 31 and has its upper peripheral edge bevelled to form a sealing surface 36 which is adapted to be moved into sealing engagement with a correspondingly bevelled seat 37 formed at the innermost end of bonnet bore 18a when the gate is moved to its upper terminal position corresponding to the flowway-opening position of the gate at which through-conduit opening 24 will be in coaxial registry with flowway 12 (FIG. 2). Opening 24 will preferably be made to a cross-section substantially equal to that of flowway 12 to assure minimum flow restriction through the flowway when the gate is in the full flowway-opening position.

Outer stem portion 29 is formed with a reduced diameter outer operator section 40, the reduction in diameter forming an annular bevelled shoulder 41 adapted to form a sealing surface for engagement with a complementary bevelled internal sealing shoulder 42 provided in bore 18a of the bonnet, shoulder 42 being located a short distance inwardly of the upper end of bonnet 18. The inner end of stem portion 29 is reduced in diameter to define a downwardly facing annular shoulder 43 disposed to be abuttable with a shoulder formed by a snap ring 44 seated in the wall of bore 18a slightly inwardly of seat 37. Snap ring 44 is adapted to form an abutment to be thrustingly engaged by shoulder 43 in response to relative longitudinal movement between the inner and outer stem portions, as will be described hereinafter. Operator section 40 of the outer stem portion is provided with an axial groove 45 communicating at its lower end through a lateral passage 46 with the annular space 47 between the wall of bore 18a and the exterior of stem portion 29. A vent port 48 communicates the interior of socket 30 with annular space 47.

The outer end of bore 18a is counterbored to form a stuffing box 49 in which seal packing 50 is mounted to seal between operator portion 40 and bore 18a. An annular packing gland 51 surrounds operator portion 40 and extends into the stuffing box into compressive relation with packing 50. The upper end of packing gland 51 is provided with a peripheral groove 52 which is adapted to receive the inner ends of anchor screws 53 threaded through the wall of bonnet cap 22 whereby to releasably lock packing gland 51 in place in the stuffing box, and thereby functioning also as a locking collar for the stem structure. A bearing assembly comprising upper and lower antifriction bearings 54 and 55, respectively, and an intervening bearing ring 56, is installed in the interior of bonnet cap 22 above gland 51. Bearing ring 56 is seated in an annular groove 57 formed in the exterior of operator portion 40. The bearing assembly is held in place on top of gland 51 by means of an inwardly extending annular flange 58 formed at the outer end of cap 22. With the bearing assembly thus positioned inside bonnet cap 22 between gland 51 and flange 58, it will be ssen that axial movement of upper stem portion 29 will be prevented, while permitting rotation thereof by means of a conventional operator (not shown), which will be secured to the upper end of operator section 40 in any conventional manner. A threaded vent plug 60 is screwed into the outer end of bore 45 and is removable for venting pressure which may accumulate in socket 30 and bore 18a.

Operation of the stem structure, for purpose of permitting replacement of packing both when the valve is opened and closed and under line pressure, will now be described.

Starting with the valve in the normal fully closed position, as illustrated in FIG. 1 wherein the relationship of the various sealing elements is shown in this normally closed position, it is desired to operate the valve so as to permit replacement of the packing while the valve is in the open position and under line pressure. To accomplish this, outer stem portion 29 will be rotated in the conventional clockwise direction and since it is locked against longitudinal movement by means of gland 51, the rotation will cause inner stem portion 27 to move upwardly until sealing shoulder 36 engages seat 37, as seen in FIG. 2. At this stage, through-conduit opening 24 will be in the fully open position. As soon as sealing surface 36 has engaged seat 37, anchor screws 53 will be retracted to release packing gland 51. This will free the packing assembly for limited longitudinal movement, whereupon continued rotation of outer stem portion 29 will cause the latter to advance inwardly, since inner stem portion 27 will now be immovable by reason of the engagement between shoulders 36 and 37. This inward movement of stem portion 29 will bring shoulder 43 into engagement with abutment ring 44 and the resultant thrusting force exerted thereby will produce tensional force on the inner stem portion which will be effective to lock sealing shoulder 36 tightly against seat 37 and thereby assure a tight metal-to-metal seal about the stem structure effective to prevent any fluid pressure leakage out of the valve housing, and to securely lock the stem structure to the housing.

With the stem structure thus locked in sealing position, bonnet cap 22 may now be completely unscrewed from bonnet 18 (FIG. 3), permitting removal of the bearing and packing subassemblies from the stuffing box. New packing can then be installed in the stuffing box, the gland and bearing assemblies replaced and enclosed by the bonnet cap, which is then again screwed on to the upper end of bonnet 18. Before the anchor screws 53 are reengaged in recess 52 of the packing gland, outer stem portion 29 will be reversibly rotated a small amount sufficient to retract shoulder 43 from abutment ring 44 to thereby return the stem structure to its initial position. Whereupon, anchor screws 53 will be reinserted to lock the parts in place and the valve will then be restored to fully sealed condition ready for operation, as may be required.

Vent port 48, passageway 46 and bore 45 serve to vent any pressure fluid which may be entrapped in socket 30, the venting being effected by removing or retracting plug 60.

To repack the valve in the closed position under pressure, starting with the valve in the closed position shown in FIG. 1, bonnet cap 22 will be partially unscrewed from bonnet 18, as through one or two turns. This may be accomplished without releasing anchor screws 53. By thus retracting the packing assembly enclosed within bonnet cap 22, outer stem portion 29 may be retracted by continuing its normal clockwise rotation, since inner stem portion 27 will be immovable by reason of the engagement of head 31 in seat 33 when the valve is in the closed position, thereby preventing further downward or inward movement of stem portion 27. The resultant retraction of outer stem portion 29 will bring shoulder 41 into tight metal-to-metal sealing engagement with shoulder 42 in bore 18a, as best seen in FIG. 4. This engagement can be made as tight as desired by the amount of retractive movement permitted by the unscrewing of bonnet cap 22. With the valve in the flowway-closing position and with shoulders 41 and 42 in tight engagement, it will be seen that the bonnet bore is again effectively sealed off against escape of pressure fluid, and the stem structure locked to the housing, so that it again becomes possible to completely remove bonnet cap 22 and the enclosed bearing and packing assemblies to thereby permit replacement of the packing.

From the foregoing, it will be seen that there has been provided in a non-rising stem gate valve a novel form of stem construction permitting repacking of the valve, both in the open and closed positions, while under full line pressures, thereby fulfilling the important objects of the invention as set forth hereinabove.

It will be understood that various alterations and modifications may be made in the details of the illustrative embodiment within the scope of the appended claims but without departing from the spirit of this invention.

What I claim and desire to secure by Letters Patent is:

1. In a gate valve including a chamber housing having a flow passage therethrough, a bonnet having a stem-receiving bore, a bonnet closure assembly removably secured to said bonnet, and a gate member reciprocable in said housing transversely of said flow passage between positions opening and closing the same, a two-part stem construction for reciprocating said gate member comprising,
   (1) an inner stem member connectible at one end to said gate member and having an externally screw-threaded section at its opposite end,
   (2) an outer stem member disposed in said bore, and having a threaded socket at its inner end to receive the threaded section of said inner stem member,
   (2a) stem packing about said outer stem member,
   (3) holding means arranged between the outer stem member and the bonnet assembly to permit rotation of said outer stem member while preventing axial movement thereof and including releasable means connected to the outer stem member operable when released to permit limited inward movement of the outer stem member in response to rotation thereof relative to the inner stem member,
   (4) an annular seat about said bore facing outwardly thereof,
   (5) an annular sealing surface positioned on said inner stem member to sealingly engage said seat at the terminus of the axial movement of said inner stem member in attaining the flow passage-opening position of said gate member, whereby to close-off said bore from fluid communication with the interior of said housing, and
   (6) a thrust-receiving abutment in said bore disposed between said stem packing and said gate and thrustingly engageable by said outer stem member in response to inward movement thereof following release of said releasable means and engagement thereafter of said stem sealing surface with said seat in response to said relative rotation between the stem members whereby to mechanically lock said inner stem member against said seat and permit removal of said bonnet closure assembly and replacement of said stem packing under line pressure.

2. In a stem construction according to claim 1, said holding means comprising:
   (a) a locking collar slidably surrounding said outer stem member,
   (b) a bonnet cap releasably secured to said bonnet about said locking collar, and
   (c) anchor screw means retractibly mounted in said cap for releasable engagement with said locking collar.

3. In a stem construction according to claim 2,
   (a) a stuffing box in said bore containing seal packing disposed about said outer stem member, and
   (b) said locking collar being disposed in axially compressive engagement with said packing.

4. In a gate valve according to claim 1 wherein said stem construction is of the non-rising type, said outer stem member being rotatable but axially fixed, and said inner stem member being non-rotatable but axially movable.

5. A gate valve according to claim 1, wherein the free end of said inner stem member carries an enlargement of polygonal shape for connection to said gate member, said enlargement having side portions extending laterally beyond the side faces of said gate member and engageable with the housing to limit inward movement of said gate member beyond the flow passage-closing position and preventing rotation of said inner stem member relative to said housing.

6. In a gate valve according to claim 1,
   (a) a second annular seat in said bore spaced inwardly from said first-mentioned seat, and
   (b) an annular sealing surface positioned on said outer stem member to sealingly engage said second annular seat upon release of said outer stem member by said holding means following attainment by said gate member of the flowway-closing position.

7. In a gate valve,
   (1) a chambered housing having a flow passage therethrough,
   (2) a bonnet assembly for said housing having a stem-receiving bore and including a removable bonnet closure assembly,
   (3) a threadedly connected two-part gate stem in said bore,
   (4) seal packing in said bore about said stem,
   (5) a gate connected to said stem for reciprocation in said housing between positions opening and closing said flow passage, and
   (6) abutment means disposed on the stem parts and the bonnet between the seal packing and the gate to mechanically lock and seal one of said stem parts in said bonnet in the flow passage-opening position and the other of the stem parts in said bonnet in the flow passage-closing position of said gate.

8. In a gate valve according to claim 7, wherein said means includes,
   (a) annular sealing shoulders carried on the respective stem parts,
   (b) longitudinally spaced annular sealing surfaces in said bore positioned to cooperate with said shoulders so that at least one of said sealing shoulders will be sealingly engageable with one of said sealing surfaces at each terminal position of the gate, and
   (c) means disposed between said bonnet and one of said stem parts to lock the latter to the bonnet.

9. In a gate valve according to claim 7, wherein said bonnet assembly includes,
   (a) a tubular bonnet,
   (b) a bonnet cap threadedly secured about the outer end of the bonnet and surrounding one of said stem parts, (c) a stuffing box in said bonnet about said outer stem part and containing said seal packing,
(d) an annular packing gland positioned in said stuffing box, and
(e) means mounted on the bonnet cap for releasably holding said packing in said stuffing box.

10. In a gate valve,
(1) a chambered housing having a flow passage therethrough,
(2) a bonnet assembly for said housing having a sealed gate stem-receiving bore,
(3) a threadedly connected two-part gate stem in said bore,
(4) seal packing in said bore about said stem,
(5) a gate connected to said stem for reciprocation in said housing and provided with a fluid conduit therethrough,
  (a) said flow passage and said conduit having substantially equal cross sections,
(6) said two-part gate stem being operable to move said gate to one terminal position disposed to coaxially align said conduit with said flow passage, and
(7) abutment means disposed on the stem parts and the bonnet assembly between the seal packing and the gate to mechanically lock and seal one of said stem parts to said bonnet at each of the open and closed positions of said gate.

References Cited

UNITED STATES PATENTS

| 920,187 | 5/1909 | Schreidt | 251—330 X |
| 938,080 | 10/1909 | Schreidt | 251—330 X |
| 2,780,233 | 2/1957 | Volpin | 251—330 X |
| 3,013,769 | 12/1961 | Volpin | 251—330 X |

ARNOLD ROSENTHAL, *Primary Examiner.*